3,017,428
ANTIHYPERCHOLESTEROLEMIC THYRONINE DERIVATIVES

Eugene C. Jorgensen, South San Francisco, Calif., assignor to Regents of the University of California, Berkeley, Calif., a corporation of California
No Drawing. Filed Aug. 18, 1959, Ser. No. 834,386
8 Claims. (Cl. 260—471)

This invention relates to novel 2'-alkyl-3,5-diiodothyronines as well as to novel inetrmediates useful for preparing them. This invention is based on the discovery of exceptionally high antihyperchloresterolemic or serum cholesterol lowering activity coupled with a very low level of thyromimetic activity just as does tetraiodo- by these compounds.

It is well known that triiodothyronine has a high level of cholesterol lowering activity but it also has a high level of thyromimetic activity just as does tetraiodothyronine or thyroxine. The prior art compound closest to the 2'-alkyl derivatives of this invention is 3',5'-dimethyl-3,5-diiodothyronine which has appreciable thyromimetic activity, an undesirable side effect for antihypercholesterolemic compounds (Barnes et al., J. Chem. Soc., 1953, 1448). Such side effects are caused by increased basal metabolism caused by the drug. The compound of this invention closest to the Barnes prior art compound is DL-2',3'-dimethyl-3,5-diiodothyronine which shows cholesterol lowering activity at 15 micrograms per kilogram per day while not giving a maximal calorigenic response at 20 milligrams per kilogram per day in the standard BMR test. This is a novel separation of activities not possessed by the Barnes isomer or the 3,5-diiodothyronine of the prior art.

More specifically the compounds of this invention are represented by the following fundamental structural formula:

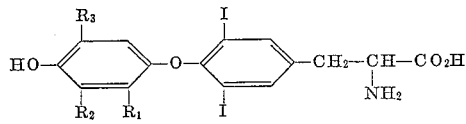

in which $R_1$ is lower alkyl, and $R_2$ and $R_3$ are hydrogen or lower alkyl but not both lower alkyl.

Advantageously one of $R_2$ and $R_3$ is lower alkyl.

Preferred and advantageous compounds of this invention are represented by the above structural formula when $R_3$ is hydrogen and $R_1$ and $R_2$ are lower alkyl advantageously methyl. The term "lower alkyl" is used to define alkyl radicals of 1 to 3 carbon atoms preferably methyl.

The preferred novel compounds of this invention are therefore represented by the following basic structural formula:

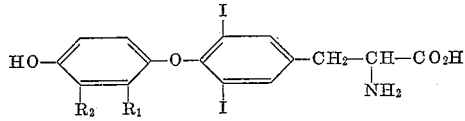

in which $R_2$ and $R_1$ represent a lower alkyl of from 1 to 3 carbons, preferably methyl.

While these amino acids are stable and useful as such, it will be recognized that in common with other amino acids either nontoxic acid addition salts with strong, pharmaceutically acceptable organic or inorganic acids, such as tartaric, chloroacetic, ethanedisulfonic, hydrochloric, sulfuric or phosphoric, or nontoxic, pharmaceutically acceptable salts with strong bases, such as ammonium hydroxide, trimethylamine or, preferably, an alkali metal hydroxide, for instance, sodium or potassium hydroxide, are fully equivalent to the amino acid parent and may, in certain cases even be preferred. The salts are prepared conveniently by dissolving the amino acid in a dilute aqueous solution of the acid or base with heat then cooling to separate the desired salt. Alternatively, more conventional methods known to the art can be used.

The DL form of these compounds is most readily obtained, however, the individual D and L isomers have demonstrable separation of activities. The D-isomeric form is particularly advantageous as compared with the L form.

The starting material for preparing the compounds of this invention in either the DL, D or L series is the known N - acetyl - 3,5 - dinitro-4-toluene-p-sulfonyloxyphenylalanine ethyl ester. The pyridinium tosylate is made from this intermediate. This crude intermediate is then reacted with various methoxyalkylphenols by heating at reflux in an unreactive organic solvent, such as a halogenated alkane, for instance, chloroform or carbon tetrachloride to give the alkylated phenoxy compound. The nitro groups are reduced, preferably catalytically with a palladium catalyst, then converted to iodo groups through the tetrazonium intermediates to form the 4 - (alkylphenoxy) - 3,5 - diiodophenylalanine N-acetyl ethyl esters, which, in turn, are hydrolyzed to the desired thyronine derivatives preferably by heating at reflux in a mixture of hydroiodic acid and acetic acid.

The following examples are illustrative of the preparation of the compounds of this invention and are not meant to limit the scope of this invention.

*Example 1*

N - acetyl - 3,5 - dinitro-4-toluene-p-sulfonyloxy - DL-phenylalanine ethyl ester (0.06 mole, Barnes, J. Chem. Soc., 1953, 777) is heated at reflux with dry pyridine (0.2 mole) and dry chloroform (80 ml.) for 30 minutes. 2,3 - dimethyl - 4 - methoxyphenol [0.09 mole, Smith, J.A.C.S., 66, 1523 (1944)] is added followed by a reflux period of about four hours. After cooling, the solution is washed with 2 N hydrochloric acid, 2 N sodium hydroxide and water, then dried and evaporated. The residue, in chloroform, is passed over activated alumina. The eluate of the first band is 4-(2',3'-dimethyl-4-methoxyphenoxy)-3,5-dinitro-DL-phenylalanine N-acetyl ethyl ester, M.P. 142–143° C.

The dinitro compound (0.02 mole) in 300 ml. of acetic acid is shaken with 2 g. of 10% palladium-on-charcoal under 30 p.s.i. of hydrogen for 45 minutes. Concentrated sulfuric acid (15 ml.) is added. After filtration, the filtrate is added over two hours to a stirred mixture of 0.081 mole of nitrosylsulfuric acid at −5° C. After stirring two hours, the cooled mixture is added to a mixture of 0.07 mole of iodine and 0.08 mole of sodium iodide in 300 ml. of water and 300 ml. of chloroform. After two hours, the chloroform extracts are washed, dried and evaporated under reduced pressure. The residue gives crystals from ethanol which is the diiodo compound, M.P. 196–198° C. This compound (10 moles) is heated at reflux in 40 ml. of glacial acetic acid and 30 ml. of 55% hydriodic acid for eight hours. The residue is reduced in vacuo at 50° C. The residue from the reduction solution is dissolved in hot ethanol with sodium metabisulfite. Additional metabisulfite is added until decolorization of the suspension is complete. The solution is ajdusted to pH 5.0 with 2 N sodium acetate. The precipitate is DL-2', 3'-dimethyl-3,5-diiodothyronine, M.P. 223–225° C.

*Example 2*

A solution of 62 g. of 4-methoxyphenol in 38 ml. of isopropanol is added slowly to 500 ml. of 75% sulfuric acid with stirring at 74° C. Steam distillation separates a distillate and a residue. The distillate is extracted with benzene and petroleum ether to give an oil which is extracted in turn with 1 N sodium hydroxide. The base soluble fraction is acidified, extracted with ether and dried. The ether gives the desired 2-isopropyl-4-methoxyphenol, B.P. 105° C. (1 mm.).

This phenol (0.146 mole) is reacted with the pyridinium tosylate (0.05 mole) as described in Example 1 to give 4-(2'-isopropyl-4'-methoxyphenoxy) - 3,5 - dinitro-DL-phenylalanine N-acetyl ethyl ester, M.P. 105–106° C. This compound (0.025 mole) in 60 ml. of acetic acid is hydrogenated with palladium. The filtrate is reacted with nitrosylsulfuric acid at —5° C. The mixture is then reacted with iodine and sodium iodide in water-chloroform to give the corresponding diiodo compound as in Example 1, M.P. 122–123° C.

The purified diiodo compound (12.5 moles) is heated at reflux in glacial acetic acid and hydriodic acid for about seven hours. The mixture was distilled to near dryness under reduced pressure at 50° C. to give the desired DL-2'-isopropyl-3,5-diiodothyronine, M.P. 184–186° C.

Example 3

2,5-dimethyl-4-methoxyphenol (0.132 mole) is reacted with 0.05 mole of the pyridinium sulfate intermediate as in Example 1 to give 4-(2',5'-dimethyl-4'-methoxyphenoxy)-3,5-dinitro-DL-phenylalanine N-acetyl ethyl ester, M.P. 152–153° C.

This compound (0.025 mole) is reduced, diazotized and iodinated as in Example 1 to give the diiodo analogue, M.P. 163–164° C. This compound (12 moles) is, in turn, hydrolyzed for four hours in acetic acid and hydriodic acid to give DL-2',5'-dimethyl-3,5-diiodothyronine, M.P. 199–201° C.

Example 4

4-methoxy-5-methyl-2-isopropylphenol (0.14 mole) is reacted with 0.05 mole of the pyridinium tosylate intermediate under reaction conditions as of Example 1 to give 4-(4'-methoxy - 2' - isopropyl - 5' - methylphenoxy)-3,5-dinitro-DL-phenylalanine N-acetyl ethyl ether, M.P. 160–162° C. This compound (0.028 mole) is reduced, diazotized and iodinated as in Example 1 to give the diiodo compound, M.P. 136–137° C. This compound (9.5 moles) is hydrolyzed as in Example 1 for eight hours to give the desired DL-2'-isopropyl-5'-methyl-3,5-diiodothyronine, M.P. 190–191° C.

Example 5

4-methoxy-2-methylphenol (0.28 mole) is reacted with 0.1 mole of the pyridinium tosylate intermediate as in Example 1 with a reflux time of four hours to give 4-(4'-methoxy - 2' - methylphenoxy)-3,5-dinitro-DL-phenylalanine N-acetyl ethyl ether, M.P. 124–125° C. This compound (0.06 mole) is reduced, diazotized and iodinated as in Example 1 to give the diiodo compound, M.P. 150–151° C. which (1.0 mole) is hydrolyzed by refluxing for four hours in acetic acid and hydriodic acid to give DL-2'-methyl-3,5-diiodothyronine, M.P. 227–229° C.

Example 6

N-acetyl - 3,5 - dinitro - 4 - toluene-p-sulfonyloxy-D-phenylalanine ethyl ester (0.03 mole) is heated at reflux in dry pyridine (0.1 mole) and 50 ml. of chloroform for 45 minutes. 2,3-dimethyl - 4 - methoxyphenol (0.05 mole) is added with refluxing continuing for six hours. After cooling, the solution is washed and worked up as in Example 1 to give 4-(2',3'-dimethyl-4'-methoxyphenoxy)-3,5-dinitro-D-phenylalanine N-acetyl ethyl ester.

This compound (0.01 mole) is reduced in acetic acid with palladium, diazotized and reacted with iodine-potassium iodide to give the diiodo intermediate which is hydrolyzed with acetic acid-hydriodic acid as in Example 1 to give the desired D-2',3'-dimethyl-3,5-diiodothyronine.

In like manner but starting with the L-pyridinium tosylate intermediate, L-2',3'-dimethyl-3,5-diiodothyronine is obtained.

Example 7

DL-2',3'-dimethyl-3,5-diiodothyronine (500 mg.) is dissolved in 10 ml. of 2% sodium carbonate solution with heating on the steam bath. Cooling separates the sodium salt.

Another 500 mg. of the thyronine derivative is heated with a minimum of 5% hydrochloric acid on the steam bath until dissolved. Cooling gives the hydrochloride salt.

D-2',3'-dimethyl-3,5-diiodothyronine (250 mg.) is dissolved in 10 ml. of 2% potassium hydroxide solution with heating on the steam bath. Cooling separates the potassium salt.

What is claimed is:

1. A chemical compound having the structural formula:

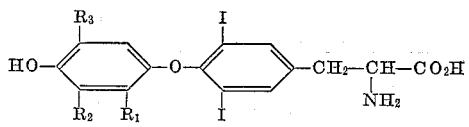

in which $R_1$ is lower alkyl of from 1 to 3 carbon atoms, and $R_2$ and $R_3$ are members selected from the group consisting of hydrogen and lower alkyl of from 1 to 3 carbon atoms, at least one of $R_2$ and $R_3$ being hydrogen.

2. A chemical compound having the structural formula:

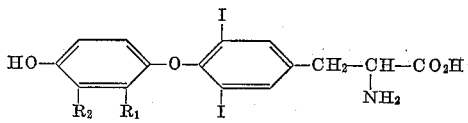

in which $R_1$ and $R_2$ are lower alkyl of from 1 to 3 carbon atoms.

3. A chemical compound having the structure

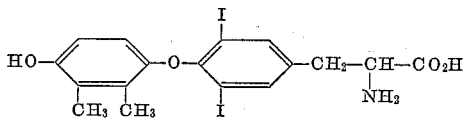

4. DL-2',3'-dimethyl-3,5-diiodothyronine.
5. The sodium salt of DL-2',3'-dimethyl-3,5-diiodothyronine.
6. A chemical compound having the structure:

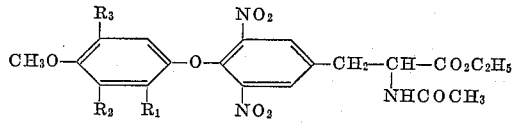

in which $R_1$ is lower alkyl of from 1 to 3 carbon atoms and $R_2$ and $R_3$ are members selected from the group consisting of hydrogen and lower alkyl of from 1 to 3 carbon atoms at least one of $R_2$ and $R_3$ being hydrogen.

7. A chemical compound having the structure:

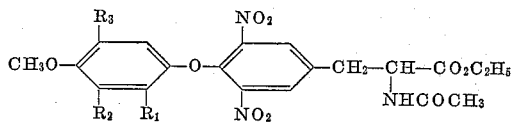

in which $R_1$ is lower alkyl of from 1 to 3 carbon atoms and $R_2$ and $R_3$ are members selected from the group consisting of hydrogen and lower alkyl of from 1 to 3 carbon atoms at least one of $R_2$ and $R_3$ being hydrogen.

8. A chemical compound having the structure:
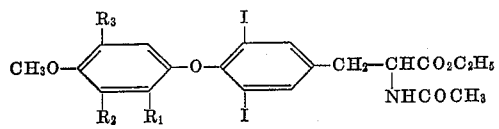
in which $R_1$ is lower alkyl of from 1 to 3 carbon atoms and $R_2$ and $R_3$ are members selected from the group consisting of hydrogen and lower alkyl of from 1 to 3 carbon atoms at least one of $R_2$ and $R_3$ being hydrogen.
References Cited in the file of this patent
Bruice et al.: J. Biol. Chem., 210, 1–9 (1954).
Bruice et al.: Arch. Biochem. and Biophy., 62, 306–7 (1956).